United States Patent

Mutoh et al.

Patent Number: 5,251,211
Date of Patent: Oct. 5, 1993

[54] MULTIPLEX TRANSMISSION SYSTEM FOR AUTOMOTIVE VEHICLES

[75] Inventors: Makoto Mutoh, Akita; Yutaka Matsuda, Hiratsuka; Yusaku Himono, Tokyo; Osamu Michihira; Toshimichi Tokunaga, both of Hiroshima, all of Japan

[73] Assignees: Furukawa Electric Co., Ltd, Tokyo; Mazda Motor Corporation, Hiroshima, both of Japan

[21] Appl. No.: 426,399

[22] Filed: Oct. 25, 1989

[30] Foreign Application Priority Data

Oct. 31, 1988 [JP] Japan .................................. 63-273306

[51] Int. Cl.$^5$ ................................................ H04J 3/02
[52] U.S. Cl. .................................. 370/85.1; 370/94.1; 370/95.2
[58] Field of Search .................. 370/85.1, 85.3, 85.4, 370/94.1, 95.2, 94.3; 371/32, 33, 34; 364/424.03

[56] References Cited

U.S. PATENT DOCUMENTS

| 4,914,654 | 4/1990 | Matsuda et al. | 370/94.1 |
| 4,942,571 | 7/1990 | Möller et al. | 370/94.3 |
| 4,951,281 | 8/1990 | Muto et al. | 370/95.2 |

FOREIGN PATENT DOCUMENTS

| 217571 | 9/1986 | European Pat. Off. | |
| 319271 | 11/1988 | European Pat. Off. | |
| 62-4658 | 1/1987 | Japan | |
| 0121436 | 10/1988 | Japan | 370/85.1 |

OTHER PUBLICATIONS

Doc #EP-A-217571—Crawford et al "Data Transfer Communication System" Oct. 9, 1986.
Doc #EP-A-319271—Muto et al. "Multiplex Transmission System" Nov. 30, 1988.
English summary of U.S. Ser. No. 276,222 and U.S. Ser. No. 277,060.

Primary Examiner—Douglas W. Olms
Assistant Examiner—Shick Hom

[57] ABSTRACT

A multiplex transmission system for automotive vehicles includes a plurality of communication nodes interconnected via a common multiplex transmission line. Each communication node includes a communication control device for controlling communication among the communication nodes in accordance with a decentralized multiplex protocol, a transmitting device for transmitting a reception acknowledgement signal to the multiplex transmission line upon receiving reception data from the multiplex transmission line normally in a reception mode, a memory device for storing beforehand, as data in table form, reception acknowledgment signals from respective ones of the communication nodes in a predetermined state, a comparator device for comparing, after a transmission, an actual reception acknowledgment signal from each communication node with the data table in a transmission mode, and a re-transmission control device for performing re-transmission control of communication among the communication nodes based on the results of the comparison.

8 Claims, 11 Drawing Sheets

FIG. 4
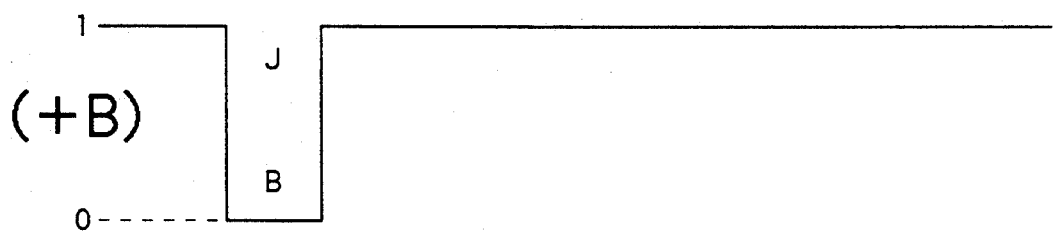
FIG. 5A
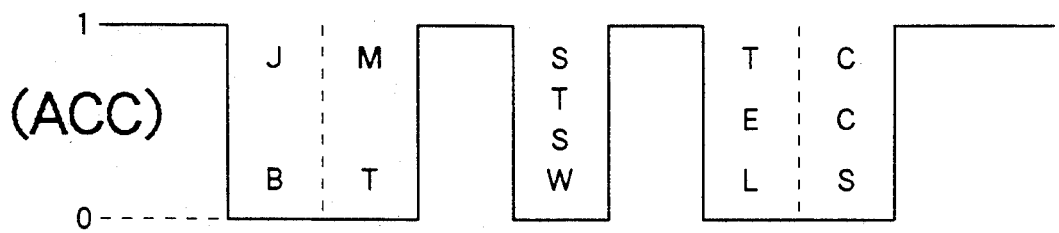
FIG. 5B
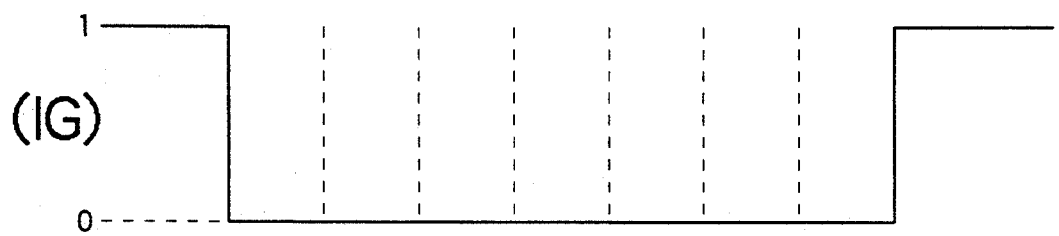
FIG. 5C

MULTIPLEX TRANSMISSION SYSTEM FOR AUTOMOTIVE VEHICLES

BACKGROUND OF THE INVENTION

This invention relates to a multiplex transmission system for automotive vehicles in which a multiplex transmission system such as a CSMA/CD system is applied to signal transmission in an automotive vehicle. More particularly, the invention relates to the transmission system of a decentralized multiplex communication network.

The greater use of electronics in automotive vehicles has been accompanied by a number of serious problems, among which are the increased size and complexity of the wire harnesses that interconnect the electronic components. Multiplex communication has become advantageous as a means of solving these problems, particularly in the automobile field. Multiplex communication refers to the time-division multiplexed mixing and transmission of data, from a plurality of nodes, on a single transmission line, and basically employs serial transmission. Nodes are node logical units which control the operation of electrical accessories (e.g., various meters and switches). Each node receives commands from, and outputs commands to, other nodes by communication and is aware of the operation of the other nodes.

In the field of automobiles, multiplex communication networks may be considered as being divided into two classes, one class being complete multiplex, and partial multiplex-type networks, and the other being centralized and decentralized type networks.

The partial multiplex type network mixes a non-multiplex communication portion and a multiplex communication portion. In the multiplex communication portion, switches and loads decentralized in terms of distances are connected by a multiplex transmission unit. However, since separate wiring is required between the multiplex transmission unit and the switches and loads, a drawback is that the numbers of wires is greater, although the overall length of the interconnecting wiring is reduced.

The centralized-type network is one in which a plurality of slave transmission units are connected to a single master transmission unit. With a network having this configuration, a smaller harness diameter is achieved but the entire system is rendered inoperative if the master transmission unit fails. Another shortcoming is that difficulties are encountered in design modification. On the other hand, the decentralized network, though higher in cost, exhibits a number of advantages, such as a much smaller harness diameter, high reliability with regard to partial failure and greater flexibility in terms of design modification. (For example of the latter, see the specification of Japanese Patent Application Laid-Open No. 62-4658).

With regard to this decentralized multiplex communication system, a CSMA/CD system is employed in accordance with an SAE (United States Automobile Technology Group) standardization proposal. According to the transmission system of this standardization proposal, data is transmitted from any node frame by frame, in which each frame possesses a destination address. When the transmitted data is received normally from the transmission line, the multiplex node of the transmission destination designated by the destination address sends back a reception acknowledgment signal (ACK) following the received frame.

The applicant has also proposed a PALNET (protocol for automotive local area network) system which is a further development upon this CSMA/CD system. For example, see the specifications of Japanese Patent Application No. 62-302421 (for which the corresponding U.S. application is U.S. Ser. No. 276,060) and Japanese Patent Application No. 62-302424 (U.S. Ser. No. 276,222). This proposed system is so designed that for every transmission of a single signal frame, the ACK signal is sent back from all active nodes that have received the signal frame. For example, if 16 nodes are connected on a transmission line, the ACK signals from these 16 nodes are transmitted serially on the transmission line. In other words, the ACK signal from each node forms the pattern of a single bit serial. Generally, with the former communication system, only when the frame of one's own address is received does that particular node send back the ACK signal. With the PALNET system, on the other hand, whether or not a received frame is one's own address is discriminated based on the identifier (ID) in the frame. The ACK signal in PALNET does not merely signify that the frame has been received normally but also functions to inform the system at least of the fact that the node which has sent back the ACK signal is active.

When attempting to simplify the signal transmission system of an automobile by multiplex communication, of prime importance is the reliability of the system. Reliability must match the peculiar conditions of the automobile. With the aforementioned CSMA/CD system or PALNET system, the ACK signal will return from a node if the node is non-existent or malfunctioning. Accordingly, when non-return of the ACK signal is detected, determining whether the cause of this is non-existence of the node or failure of the node is theoretically impossible.

In a common LAN (local area network), it is permissible to regard non-return of the ACK signal as being ascribable to non-existence of the node, which may be due to a modification in the system configuration (such as turning off the power supply of a terminal). Such is not the case in an automotive vehicle, however, particularly an automobile. The reason is that in multiplex communication in an automobile there are also nodes which handle electrical accessories (meters, for example) that are essential for operation, and it would be improper to cut such a node off from the network system merely because the ACK signal did not return from the node.

A feature peculiar to automobiles is that an active node changes depending upon the position (OFF, ACC, ON) of the engine key. For example, the node for an air conditioner switch is inactive when the engine key is in the ACC position but active when the key is in the ON position. When the engine key is in the ACC position in a CSMA/CD or PALNET environment, the air conditioner switch node, which will not return the ACK signal in this case, is regarded as being non-existent, just as other nodes which do not return the ACK signal. Accordingly, there is the possibility that a node regarded as being non-existent may exist, despite the fact that it is actually malfunctioning. This is one factor that detracts from the reliability of decentralized multiplex communication. One expedient for eliminating this difficulty would be to supply all nodes with power equally irrespective of the engine key position (OFF, ACC, ON). This would render the nodes active at all times, so that the ACK signal will return from nodes that have not failed, thus making it possible to distinguish between malfunctioning node and active nodes. However, supplying all nodes with power is unrealistic in view of the problem of battery capacity.

SUMMARY OF THE INVENTION

The present invention has been devised in view of the foregoing and its object is to provide a highly reliable multiplex transmission system for automotive vehicles of the type in which a plurality of multiplex transmission nodes are connected to a single transmission line, as shown for example in FIG. 1, wherein it is possible to distinguish between failed nodes and inactive modes.

Another object of the present invention is to provide a multiplex transmission system for automotive vehicles in which it is possible to accurately distinguish between failed nodes and inactive nodes, and in which it is possible to recover from a temporary transmission fault by performing a re-transmission.

In accordance with a preferred embodiment of the invention, bit positions in a reception acknowledgment signal field are decided in advance with regard to each communication node.

In accordance with a preferred embodiment of the invention, an active communication node is decided at a power supply status which varies in dependence upon engine key position.

In accordance with a preferred embodiment of the invention, a faulty node is determined to exist when re-transmission is performed in excess of a maximum number of times.

A further object of the present invention is to provide a multiplex transmission system for automotive vehicles which includes a plurality of ordinary nodes and a management node, as shown for example in FIG. 1, wherein it is possible to accurately distinguish between a failed node and an inactive node and recover from a temporary transmission fault by performing a re-transmission, and wherein it is possible to execute overall system management.

In accordance with a preferred embodiment of the invention, the system is notified of existence of a faulty node when this is determined.

In accordance with a preferred embodiment of the invention, the network system is reset when existence of a faulty node is determined.

BRIEF DESCRIPTION OF THE DRAWINGS

FIG. 4 is a diagram illustrating a configuration of bits assigned to an ACK field with regard to each node;

FIGS. 5A through 5C are diagrams for describing reception ACK patterns at normal operation conforming to respective power supply status;

DESCRIPTION OF THE PREFERRED EMBODIMENTS

An embodiment will now be described, with reference to the accompanying drawings, for a case where the present invention is applied to a multiplex communication system of an automobile using the aforementioned PALNET system.

Figure 1:
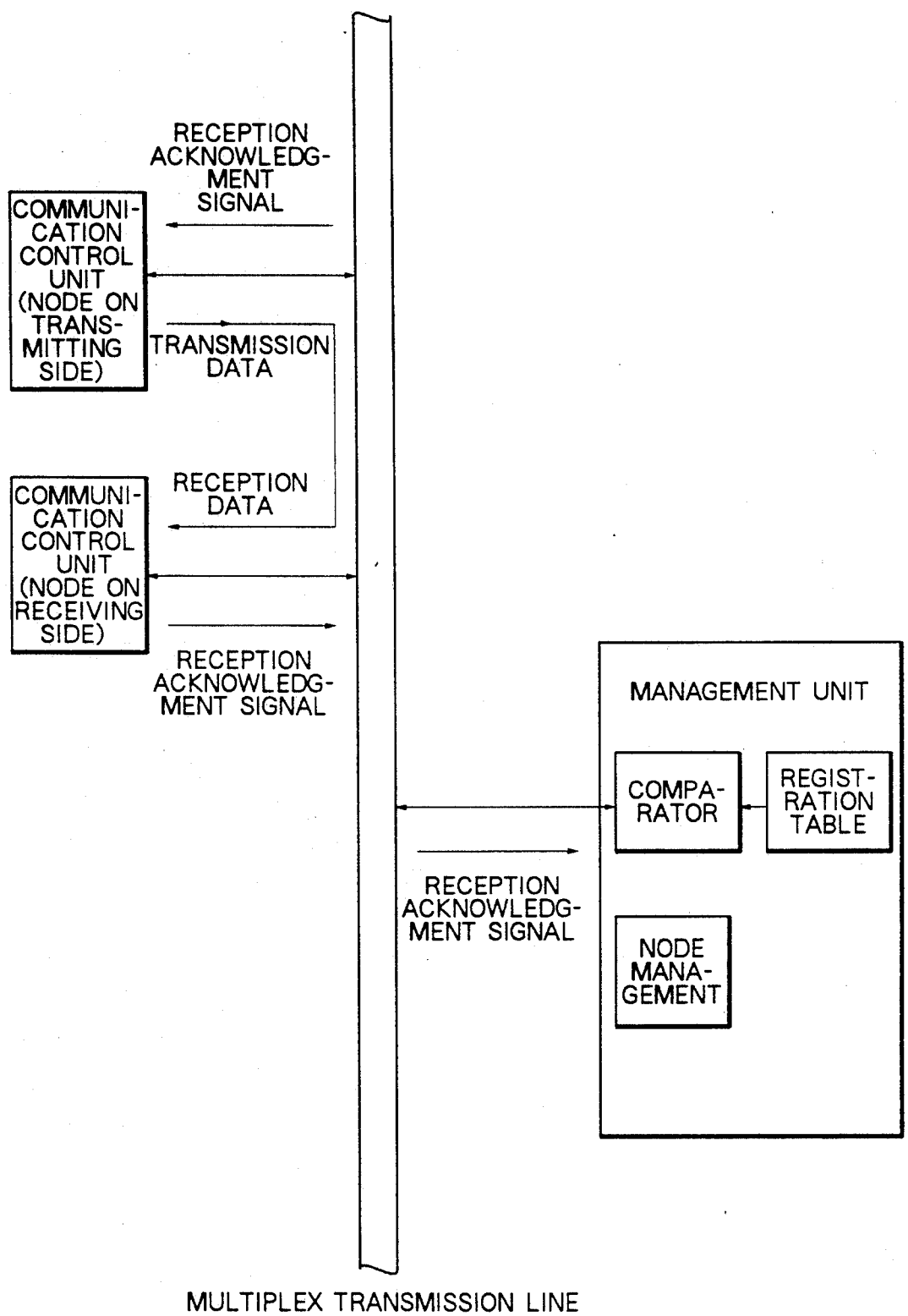
FIG. 1 is a block diagram illustrating the construction of the present invention.
Figure 2:
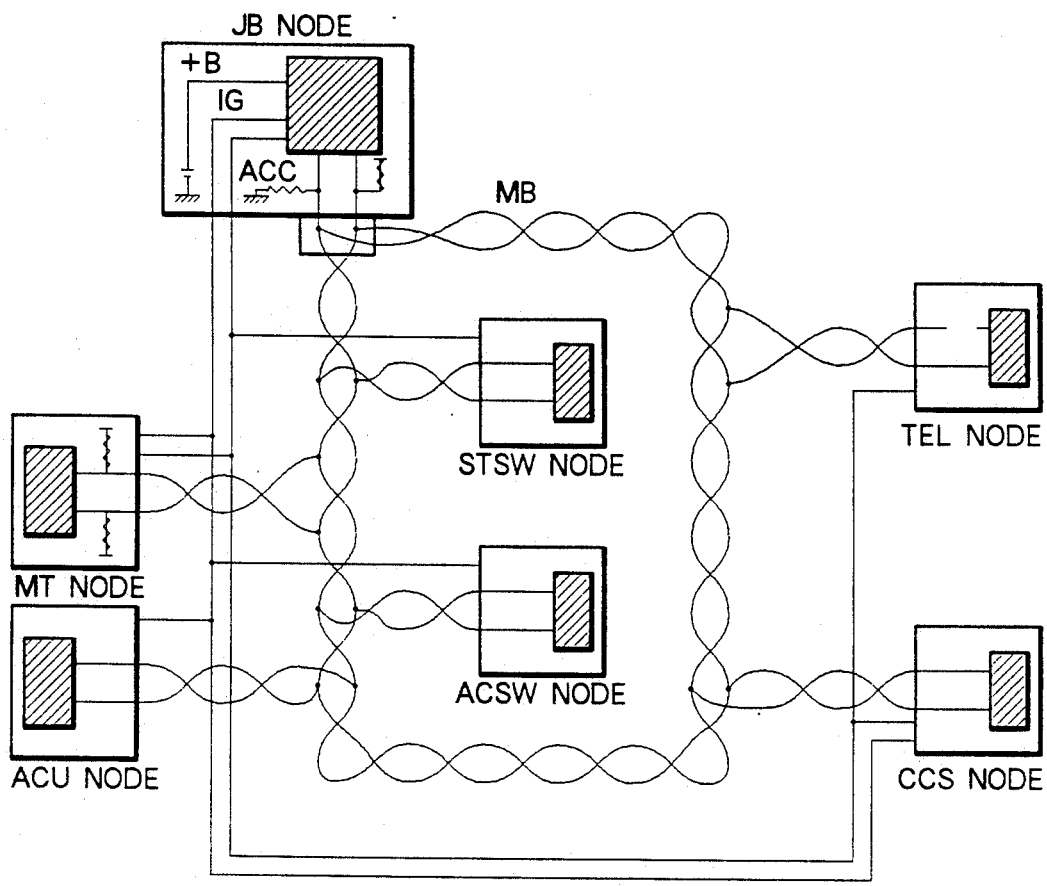
FIG. 2 is a diagram for describing the network of a multiplex transmission system according to an embodiment of the present invention.

FIG. 2 is an overall block diagram illustrating the connection of nodes used in the system of the embodiment. In order to simplify the description, it will be assumed that seven nodes are used in the illustrated embodiment. Each node is connected via a multiplex transmission bus MB comprising a pair of twisted wires. These multiplex transmission nodes are a node CCS for an electrical accessory which implements display control of a navigation apparatus, audio apparatus or the like, a node MT for display control of a meter, a node TEL for a car telephone adapter, a node ACU for an air conditioner control unit, a node ACSW for an air conditioner switch, a node STSW for switches in the vicinity of the steering wheel, and a node JB having a junction box for supplying power to each of the nodes and for connecting test equipment for self diagnosis. The aforementioned switches in the vicinity of the steering wheel includes a right-turn switch, a left-turn switch, a parking-lamp switch, a horn switch and a head lamp high-beam switch. The meters include a right-turn indicator, a left-turn indicator and a head lamp high beam indicator.

The multiplex bus MB in the illustrated embodiment is, in terms of negative logic, a wired-OR with respect to signals outputted by the nodes. In other words, if two or more signals are transmitted by nodes at the same time and even one of these nodes outputs logical "0", then the value of the signal on the bus MB at this time becomes logical "0".

The power supplied to each node will now be described. In the present embodiment, three power supplies, namely +B, ACC and IG (12 V each), are provided in conformity with engine key position, just as in an ordinary automobile. The power supplies applied to each node differ depending upon the function and application of the electrical accessory or switch to which the node is connected. That is, +B, ACC and IG are supplied to the JB node since it is required that this node be supplied with power at all times, except for when the engine key is withdrawn. Nodes which are supplied with power from two sources, namely, ACC and IG, are MT and CCS nodes. Nodes supplied solely with power from the source ACC are the STSW and TEL nodes. The ACSW and ACU nodes are supplied solely with IG.

The nodes shown in FIG. 2 are only seven in number in order to simplify the description; in actuality, nodes for a large number of switches and electrical accessories would be connected. For example, front-side and rear-side nodes may further be provided, in which case the front-side nodes would include those for a front right turn signal lamp, front left-turn signal lamp, front parking lamps and horn, and the rear side nodes would include those for a rear right-turn signal lamp, rear left-turn signal lamp and tail lamps. In addition, the connections between the nodes and each power supply are not limited to the relationship shown in FIG. 2, for other connection relationships may be conceived taking into account operability, ease of use, etc.

It is possible for the JB node to be connected to another, non-multiplex bus (not shown) besides the multiplex bus MB. An actual automobile is equipped with an engine controller and anti-lock brake controller, which are connected to the aforementioned non-multiplex bus line. These controllers are also one "node" constituting the system. The seven nodes connected to the multiplex node MB of FIG. 2 shall be referred to as "multiplex nodes" hereinafter in order to distinguish them from nodes connected to a non-multiplex bus.

FRAME FORMAT

Figure 3:
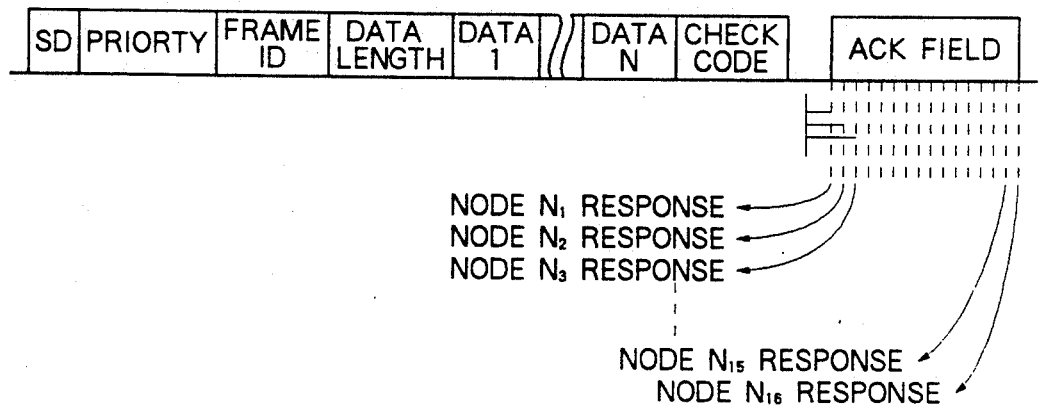
FIG. 3 is a diagram illustrating the format of a frame used in the embodiment of the present invention.

In the multiplex transmission system for automobiles of the present embodiment, automobile operating information is transmitted every frame F, which has the configuration shown in FIG. 3. Here the frame F has an SD (start delimiter) code, a priority code, a frame ID code, a data length, data 1 through N, and a check code.

The "SD code" is a specific code representing the start of the frame F. When a node on the receiving side receives the SD code, it recognizes the start of the frame F. The "priority code" indicates order of priority, which designates which signal is to be given priority for processing when a plurality of multiplex nodes transmit data simultaneously so that the signals collide. When a plurality of items of data collide, data having the high priority is given precedence for processing. The "frame ID code" identifies which data is to be assigned to each bit of a data field and, in a sense, indicates a combination of data in a data field of the frame F. The multiplex nodes on the receiving side are capable of ascertaining the contents of the data in a data field of the frame F by means of the ID code of the frame. As for "data length", a number of items of data are written following this. If these items of data are N in number, then N will be transmitted as the data length. At a multiplex node which has received this frame, only the data within the data length is read. The field which immediately follows this data is a CRC check code (error detection code). End of the frame can be determined by acknowledging this code.

NETWORK CONTROL THEORY

A reception acknowledge signal field (ACK field) shown in FIG. 3 will now be described. The applicants have proposed this ACK field as a PALNET in Japanese Patent Application No. 62-302421. This field comprises a plurality of bits, e.g., 16 bits, in which each multiplex node is assigned a bit field decided beforehand with respect to the multiplex node. Each node verifies, by the value of each bit in the ACK code, whether the frame that it has transmitted has been received normally by other nodes.

More specifically, a node on the side which has transmitted a frame makes "0" only the bit of the position assigned to its own node in the ACK field of 16 bits, makes "1" all other bits, and then transmits the ACK signal to the MB bus. That is, one "0" bit and 15 "1" bits are sent to the transmission line following a prescribed gap between these bits and the transmitted frame. Based on the check code, a multiplex node on the receiving side checks to see that there is no error in the contents of the frame. If there is no error, "0" is transmitted as the reception acknowledgment signal (ACK) to the bit area at the position decided in advance with regard to each node in the ACK field. Nodes which return the "0" logic are not only destination nodes of the transmitted frame but all nodes which have received this frame without error. Accordingly, a node for which the ACK field is "0" indicates that a frame has been received normally and that this node is active.

FIG. 4 shows the positions of ACK bits assigned to respective ones of seven nodes in the embodiment of FIG. 2. The assigned positions may be any positions as long as they are decided in advance. In FIG. 4, bit positions following CCS are "1"s since no further nodes exist in the embodiment of FIG. 2.

FIGS. 5A through 5C illustrate arrangements of ACK bits which would be returned if the active nodes in each power supply status were normal for a case in accordance with the ACK bit assignment of FIG. 4.

FIG. 5A illustrates the ACK signal which would be returned from the JB node in a case where the +B status prevails at the stage where the engine key is inserted. FIG. 5B illustrates the ACK signal which would be returned from each of the five nodes of the JB, MT, STSW, TEL and CCS when the ACC status of the power supply prevails. FIG. 5C illustrates the ACK signal which would be returned from all seven of the nodes More specifically, at the time of transmission, a node on the transmitting side has 15 bits at logical "1", the exception being the bit allotted to its own ACK field, as mentioned earlier. Therefore, at the respective power supply state, a node which is not active naturally will not return the ACK signal, so that the corresponding bit portion will remain at "1". An active node will return "0" as the ACK signal. In other words, FIGS. 5A through 5C show 16-bit ACK patterns that will be returned at each power supply state if all nodes at this status are normal.

These ACK patterns in each power supply state are stored beforehand as a table in a ROM or the like. If an actually received ACK pattern in each power supply state (this pattern shall be referred to as a "received ACK pattern") is compared with the patterns previously stored in the table (these patterns shall be referred to as "registered ACK patterns") to determine whether an ACK bit of a node which should be active is correctly "0" or whether an ACK bit of a node which should be inactive is correctly "1", then, even if there is a node for which the ACK bit is not returned, it can be correctly judged, in conformity with each power supply state, whether this node does not return the signal because it is faulty (which includes a condition in which the node is non-responsive as a result of noise) or whether non return of the signal is normal because the node is not being supplied with power.

If the position of the ACK bit with regard to each node is decided as shown in FIG. 4 and the active nodes in each of the power supply states are decided as shown in FIGS. 5A through 5C, then the foregoing "registered ACK patterns" will be as follows:

"0111111" "111111111"

in the +B state;

"0010100" "111111111"

in the ACC state; and

Figure 6:
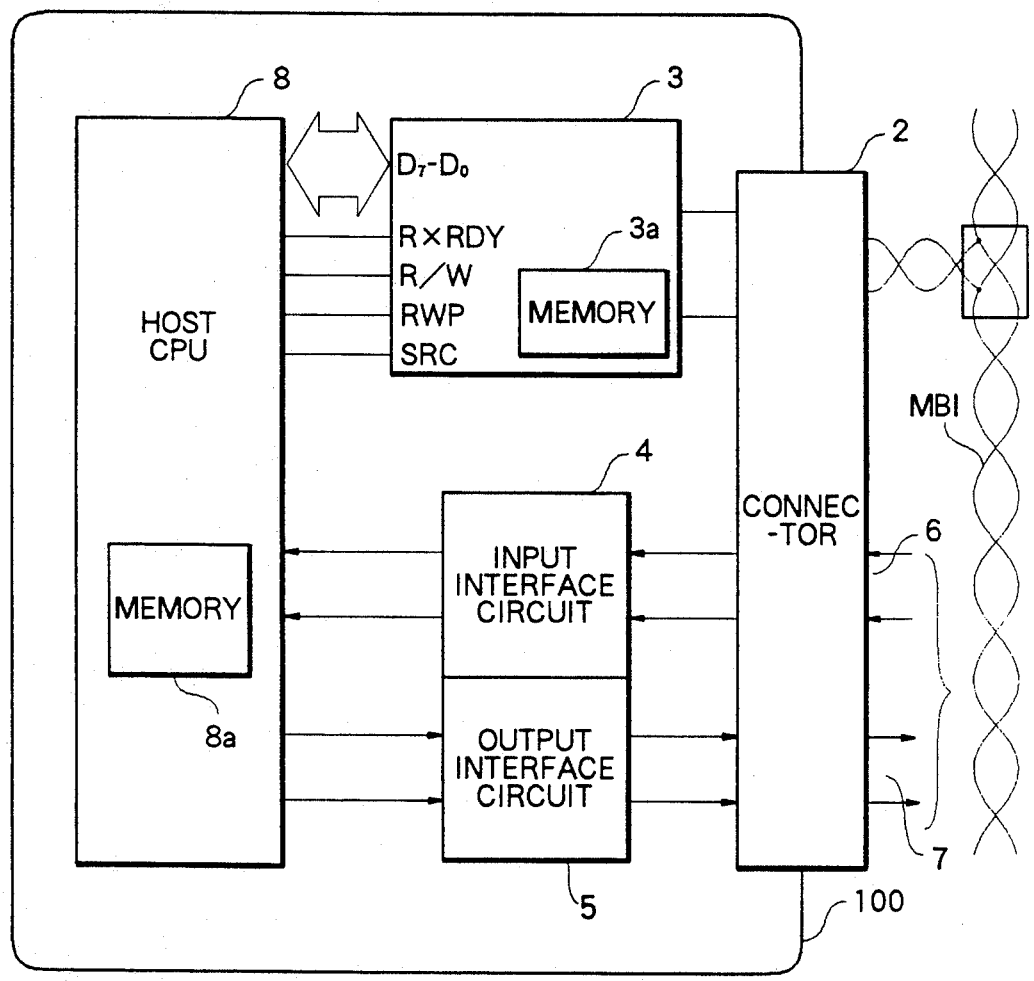
FIG. 6 is a diagram showing a node hardware configuration used in the embodiment of the invention.

"0000000" "111111111"

in the IG state. For the sake of convenience, the table storing the "registered ACK patterns" shall be referred to as a "registered ACK table" in the description that follows. As shown in FIG. 6, this table is stored in a memory $3a$ of a multiplex communication LSI 3 and in a memory $8a$ of a CPU 8.

FRAME TRANSMISSION/RECEPTION SEQUENCE

Figure 7:
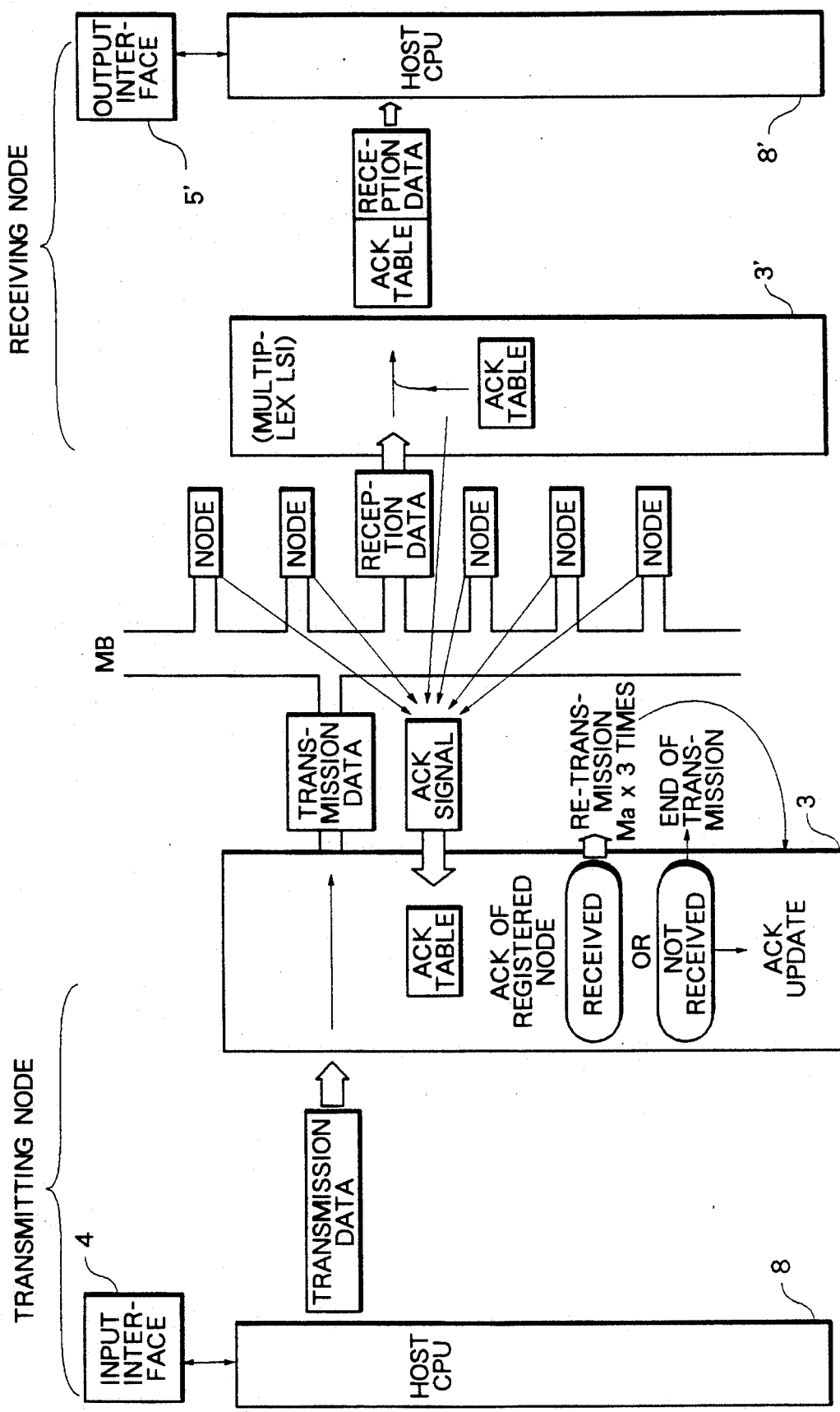
FIG. 7 is a diagram showing the flow of data when data is transmitted from a transmitting node to the destination of a receiving node.

FIG. 6 illustrates the general construction of a multiplex communication controller used commonly for each of the nodes of FIG. 2. FIG. 7 is a simplified view illustrating a frame transmission/reception sequence between nodes.

In FIG. 6, a multiplex communication controller 100 comprises a transmission line MB1, which is the transmission line shown in FIG. 2, a connector 2 for connecting the multiplex communication controller 100 to the transmission line MB1, a multiplex interface module 3 for performing communication control such as CSMA/CD control, an input interface circuit 4, an output interface circuit 5, and a host CPU 8. The multiplex I/F module 3 detects the carrier on the transmission line MB1, detects collision and performs such processing as reading serial data from the transmission line MB1 and converting it into parallel data ($D_7$-$D_0$). In addition, the multiplex I/F module 3 administers delivery of the read eight-bit parallel data ($D_7$-$D_0$) to the host CPU 8, as well as conversion of parallel data from the CPU 8 into serial data. It also checks vertical parity and computes error detection codes. That is, the multiplex I/F module 3 administers control of the physical layer level in the network. The host CPU 8, switches and electrical accessories such as loads (not shown) are interconnected via wires 6, 7, the input interface circuit 4 and the output interface 5. The CPU 8 executes processing of inputs from the input interface circuit 4 and processing for converting the input data into transmission data. In addition, the CPU 8 takes the frame data received by the multiplex module 3 and provides a prescribed electrical accessory with an output corresponding to this data via the output interface 5.

Frame transmission/reception between nodes and error processing in the present system will now be described with reference to FIG. 7.

It is assumed here that the node which has received a frame is the ACSW node, by way of example. In this case, the host CPU 8 of the ACSW node informed, via the input I/F circuit 4, of closure of the switch for starting the air conditioner, forms a frame destined for the multiplex communication controller of the ACU (air conditioner control unit), as shown in FIG. 3, and transmits the frame to the transmission line MB1 via its own multiplex I/F module 3. A multiplex I/F module 3' of the ACU node which has received the frame data from the transmission line MB1 analyzes the received frame data and outputs a drive signal via an output interface circuit 5' in order to activate the compressor (not shown) of the air conditioner.

A case will be described wherein an error occurs in the process of transmitting a frame from the ACSW node to the ACU Node in FIG. 7. In the PALNET system, set forth hereinabove, a node which is the destination of a transmission is specified by the frame ID (FIG. 3), but if nodes in addition to those specified by the frame ID also received the frame without error, then these will return the ACK signal to the node from which the transmission originated. The ACK signal from each of these nodes has 16 bits in the ACK signal shown in FIG. 4, etc., as described earlier.

A re-transmission algorithm in frame transmission is as follows: Assume that the maximum number of re-transmissions is three, by way of example. If there is a node which returns the ACK signal even once by the time three re-transmissions are made, then it is construed that the frame has been transmitted normally with respect to this node. This re-transmission processing is carried out by the multiplex communication interface module 3.

Figure 8:
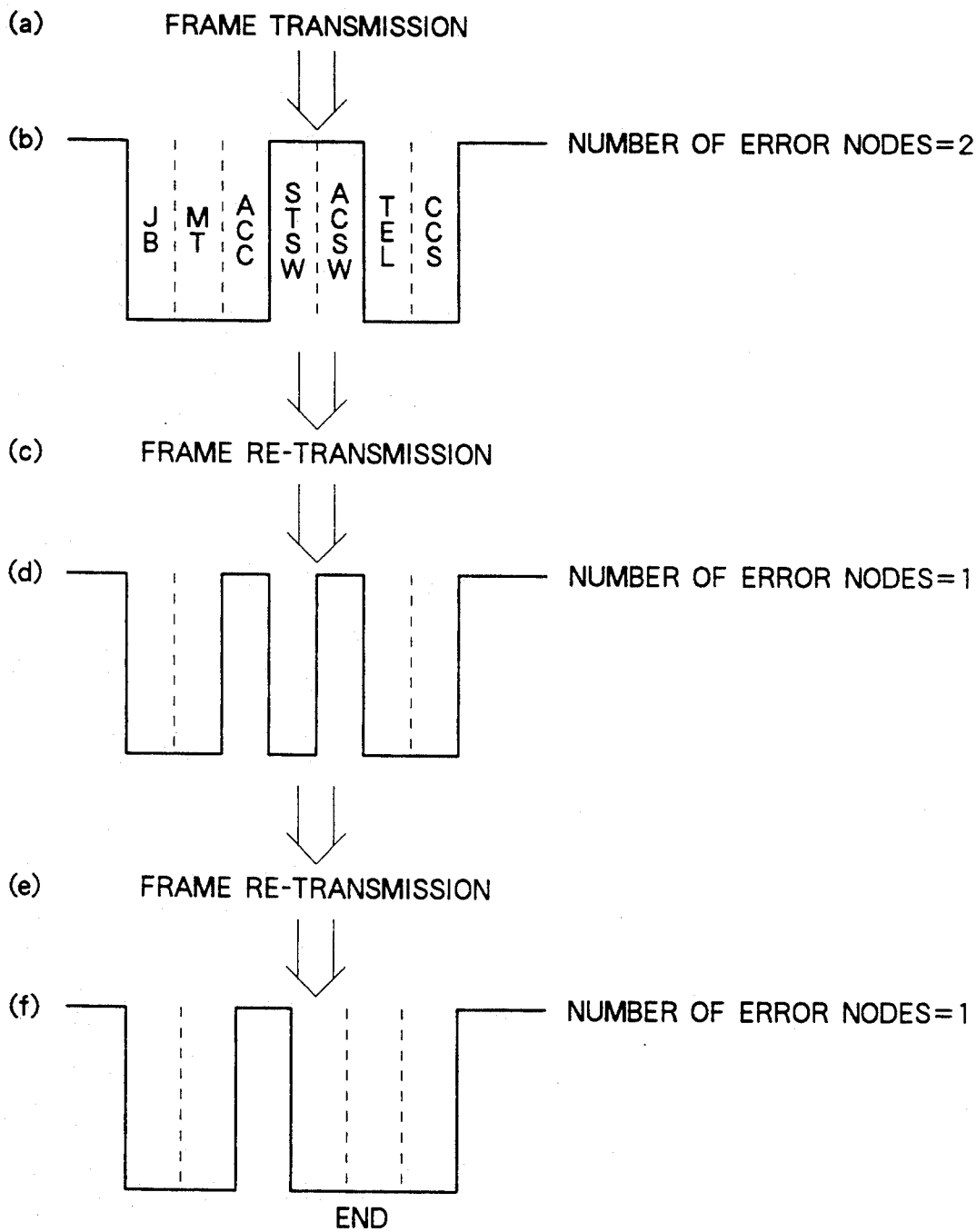
FIG. 8 is a diagram for describing a re-transmission algorithm at occurrence of an error in the system of FIG. 7.

An algorithm of a frame transmission between nodes will now be described in detail taking as an example a frame transmission from the JB node. The example depicted in FIG. 8 is for a case where the system is in the power supply state which prevails when the engine key is in the IG position. In this power supply state, there are normally seven active nodes (nodes corresponding to the succeeding nine bits are not used). Therefore, the pattern in the registered ACK table is "0000000111111111"

Assume that the JB node transmits one frame to all of the other six nodes [FIG. 8($a$)]. That is, the case here is one in which the frame ID is that of the six nodes other than the JB node. Assume that nodes other than the STSW and ACSW nodes return the active ACK signal (received ACK pattern=0001100 . . . ) in response to this transmission. This indicates that the nodes which could not receive the transmission are two in number, namely the STSW and ACSW modes [FIG. 8($b$)]. Accordingly, the JB node next stores the ID's of the STSW and ACSW nodes in the frame ID and re-transmits the frame [FIG. 8($c$)]. Assume that the ACK pattern (0010100. . . ) shown in FIG. 8(d) is returned in response to this re-transmission. In other words, the nodes which do not return the ACK signal in response to the re-transmission are the ACU and ACSW nodes. With regard to the ACU node, however, the frame should have already been received at the first transmission. Therefore, the faulty node incapable of reception at the second transmission is only one, namely the ACSW node.

Further, a third transmission in which the frame ID is that solely of the ACSW node is performed at FIG. 8($e$). It is assumed that the received ACK pattern (0010000. . . ) shown in FIG. 8($f$) is returned in response to this re-transmission. In other words, only the ACU node does not return the ACK signal. In addition, the ACSW node, which did not return the ACK signal at the preceding transmission [see FIG. 8($c$)], now returns the ACK signal in response to the present re-transmission. Since the ACU node has already made a normal reception in response to the initial transmission [FIG. 8($a$)], it is deemed to be problem-free. Thus, all of the active nodes receive the frame normally at least once by the time a total of three transmissions are made. Frame transmission ends at this time.

In order to carry out the frame re-transmission sequence of FIGS. 7 and 8, it is required to have, at the node on the transmitting side, a register (the received ACK table) for storing the ACK pattern received at the frame re-transmission that follows the initial frame transmission, and a register (a reception recording table) for storing a node which has made a normal reception at least one time at the frame re-transmission that follows the initial frame transmission. These registers are provided in the memory on the side of the multiplex module 3 of each node.

If, after the maximum of three re-transmissions, there is one node that was incapable of correctly receiving the frame even once among those nodes that should have received the frame, this node is construed as having left the network and the bit in the registered ACK table corresponding to this node is made "1". In other words, if all re-transmissions fail, the relevant bit position in the registered ACK table is made "1" with regard to the particular multiplex node, thus updating the registered ACK table. This updating processing is performed by the CPU 8.

If the power supply state changes, there will be nodes for which power is supplied anew to change the status of the node from inactive to active. When such a node receives a frame, it will change so as to send back ACK="0". Since the registered ACK pattern also changes, however, this will not be mis-detected as being an abnormality.

Re-transmission control and updating control of the registered ACK pattern in FIGS. 7 and 8 is performed for any node that is active. If the ACK signal is not returned even when the re-transmission is made the maximum number of times, it is necessary that the overall system (and/or the driver) be informed of the fact that the particular node is faulty. It will suffice if this alarm operation is performed by one node at all times. This monitoring/alarm operation should be carried out if there is an abnormality at all stages will follow insertion of the engine key. Therefore, it is desired that a node which should perform the monitoring/alarm operation be provided in the JB node supplied with power at each of power supply states +B, ACC, IG. In this embodiment, the CPU 8 of the JB node takes the initiative in performing this alarm operation. It is of course permissible to set a separate special-purpose node for monitoring/alarm independent of the JB node.

MONITORING CONTROL

Network monitoring control by the JB node will now be described in accordance with FIGS. 9 through 12. As set forth above, the JB node possesses a frame transmission/reception function, a check function based on the registered ACK patterns, and a re-transmission function, just as the other nodes. In addition, the JB node has the aforementioned monitoring/alarm function, unlike the other nodes.

Figure 9:
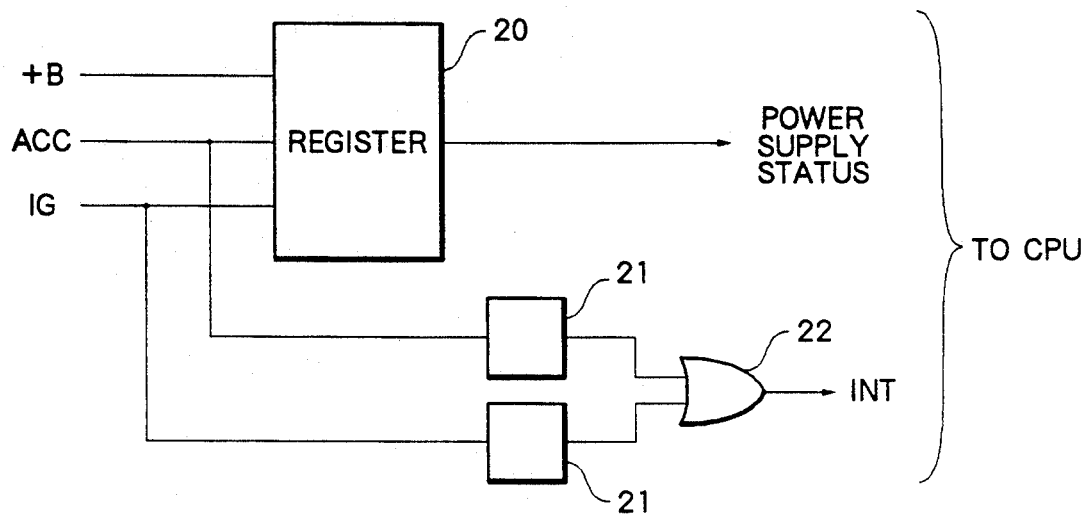
FIG. 9 is a circuit diagram of a circuit for monitoring power supply status.
Figure 10:
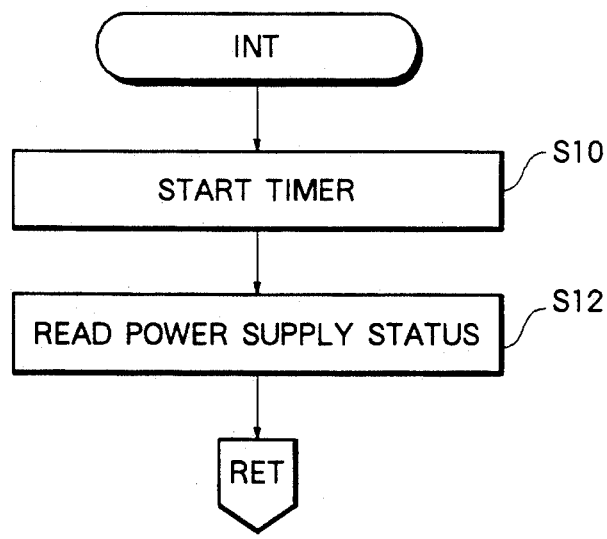
FIG. 10 is a flowchart showing a control procedure through which a JB node monitors power status.

The circuit depicted in FIG. 9 is for holding which power supply is active at the present time, and for applying an interrupt to the CPU 8 of the JB node upon detecting a change in the ACC and IG power supplies. Which power supply is active is transmitted to the CPU 8 of the JB node as status information. More specifically, as shown in FIG. 9, the circuit includes a register 20 for holding which power supply, from among the power supplies +B, ACC, IG, is active. The register 20 comprises a level changer for changing the +12 V level to the voltage of the IC (integrated circuit) level, as well as a latch. Detector circuits 21 for detecting a change in voltage are for applying an interrupt to the CPU 8 when the power supply changes to the ACC state or to the IG state. FIG. 10 shows an interrupt processing routine, which is in the CPU 8 of the JB node, started by the applied interrupt (INT).

Since the fact that an interrupt has occurred in the CPU 8 of the JB node signifies that the power supply has changed, a timer equivalent to a predetermined time interval is started at a step S10 in the flowchart of FIG. 10. The timer monitors the time-up state by means of a control procedure (step S44 in the flowchart of FIG. 13), described below, executed by the CPU 8. This extra period of time until the time runs out in the timer is used for the following purpose: When there is a change in the power supply, this causes some nodes to become active and others to become inactive. Since a change from active to inactive U or from inactive to active will be sporatic as a result of any variance in the IC of the node, the received ACK pattern will not be reliable during this period. This period is treated as a transient period, during which the status of the power supply is not read in.

After the timer is set, the program proceeds to step S12, where the status of the power supply is read in from the register 20. Thus, whenever there is a change in the power supply, the CPU 8 of the JB node is capable of ascertaining the present status of the power supply and of setting the transient period.

Figure 11:
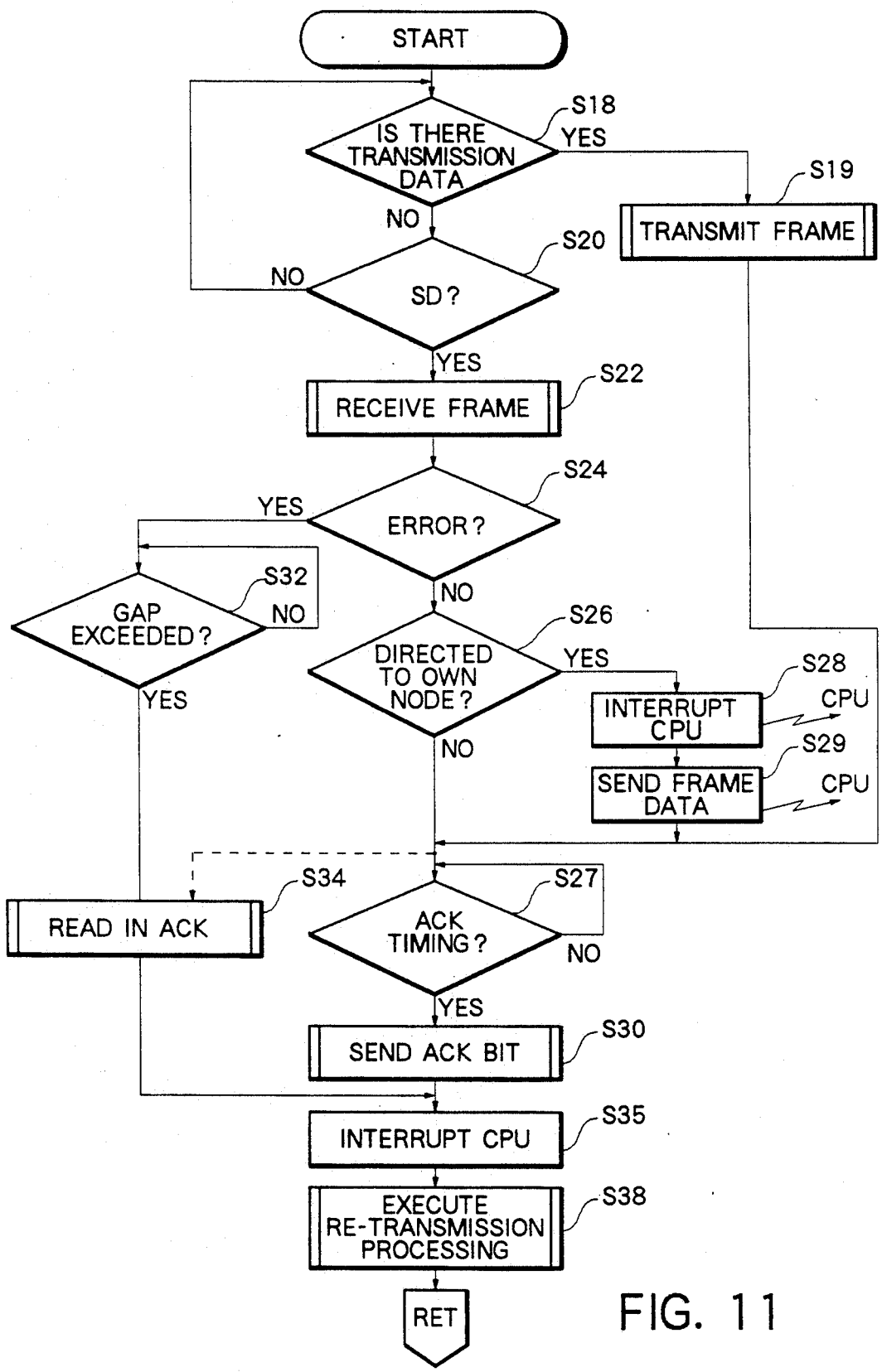
FIG. 11 is a flowchart in accordance with a communication control procedure in a multiplex interface module of a JB node.

FIG. 11 is a flowchart relating to frame transmission/reception control in the multiplex interface module (the I/F module LSI 3 of FIG. 6) of the JB node. The LSI 3 possesses a controller (not shown) which performs transmission control in the CSMA/CD system, an encoder/decoder (not shown) which performs code conversion of the logic level of the data on the bus MB1, a transceiver (not shown) which operates a level changer connected directly to the bus MB1, and a DMA (not shown) for accessing the memory of the CPU 8.

The JB node has the following functions (i), and (ii), which it shares with the other nodes:

(i) In a case where the node is on the transmitting side, the node transmits its frame, checks the ACK pattern which it subsequently receives, performs re-transmission control if necessary, and updates the registered ACK pattern if the time runs out for the number of re-transmissions.

(ii) In a case where the node is on the receiving side, the "0" ACK bit is returned if the frame is received normally, and the "1" bit is returned if the frame is not received normally.

The JB node possesses also the following function (iii), which the other nodes do not have:

(iii) If there is a node for which the number of re-transmissions is excessive, the JB node so informs the entire system. In the present embodiment, the JB node generates frame data indicating this fact, transmits it to the MT node and updates the registered ACK table.

The control procedure will be described in detail in accordance with FIGS. 11, 12 and 13. Step S18 in the flowchart of FIG. 11 calls for the LSI 3 of the JB node to check whether there is a transmission frame from the CPU 8. If there is no frame that should be transmitted, the program proceeds to step S20, at which the JB node waits for the SD from other nodes to be placed on the bus MB. When the SD is detected, the frame data which follows the SD is received at step S22. If there is no error (a CRC error, collision) at the time of frame reception, the program proceeds from step S24 to step S26, where it is checked to see whether the received frame is destined for the JB node. If it is data destined for the JB node, an interrupt to the effect that the frame has been received is applied to the CPU 8 of the JB node at step S28, after which the frame data is sent to the CPU 8 via the $D_7-D_0$ bus (see FIG. 6) at step S29. The program then proceeds to step S30.

If the received frame is not a frame directed to the JB node, the program proceeds to step S27, at which the system waits until the ACK timing (see FIG. 4) allotted to the JB node arrives. When the ACK transmission timing arrives, the ACK signal is sent out on the MB1 at step S30. In order to receive the ACK bits from other nodes along with its own ACK bit prior to transmission of this ACK bit for the JB node, the LSI 3 of the JB node assumes the reception mode and reads the 16-bit ACK signal at step S34. Thus, as long as the frame is received normally, the ACK bit is transmitted and the program proceeds to step S35, irrespective of whether or not the frame is directed to the JB node.

If an error is sensed at step S24 during frame reception, the program proceeds to step S32, at which the system waits for the passage of the gap time (time interval) up to the ACK field following the error check field (FIG. 3). Next, at step S34, the 16-bit ACK signal is read in, after which the program proceeds to step S35.

Step S35 calls for the CPU 8 of the JB node to be interrupted for the purpose of transmitting the received ACK pattern. This is followed by step S38, at which re-transmission control of the kind described in connection with FIG. 8 is performed. The subroutine of step S38 is illustrated in detail in FIG. 13.

In a case where it is found at step S18 that there is frame data to be transmitted to another node by the JB node, the program proceeds to step S19 in order for this frame to be sent. After the frame is sent at step S19, the LSI 3 enters the reception mode in order to receive the ACK bit from other modes. It also enters the transmission mode in order to transmit its own (i.e., the JB node) ACK bit. Sending the received reception ACK pattern to the CPU 8 is the same as the control at the time of frame reception from step S20 onward, described above.

Figure 12:
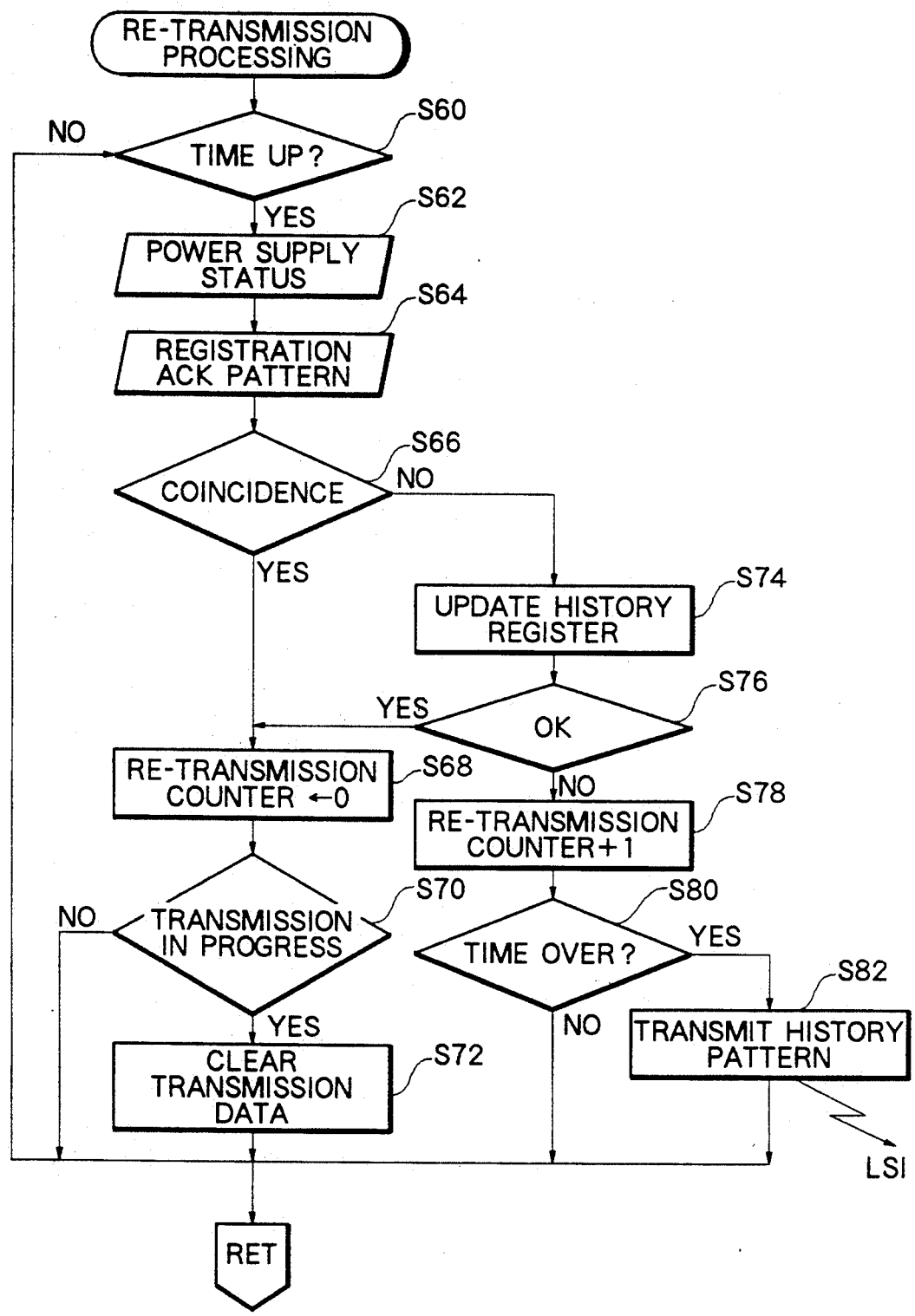
FIG. 12 is a flowchart of a re-transmission control subroutine in a JB node.
Figure 13:
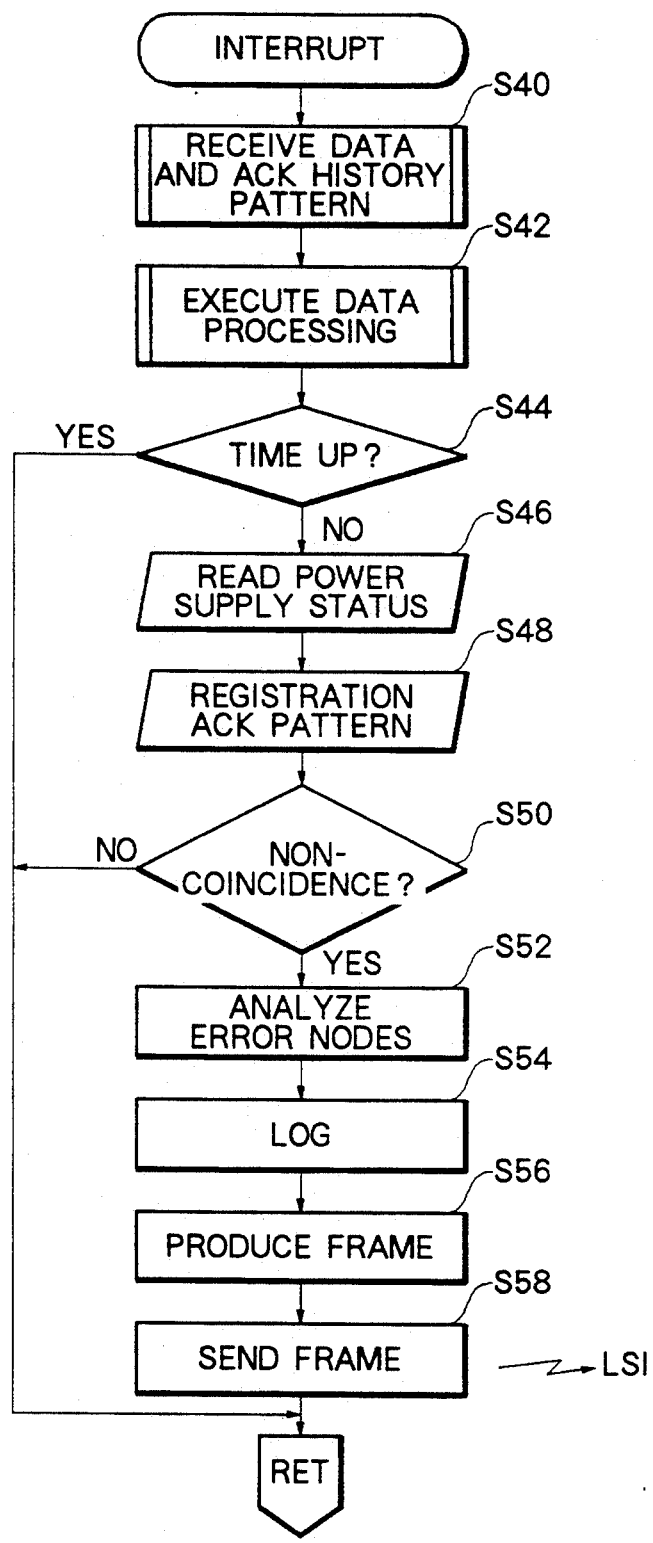
FIG. 13 is a flowchart in accordance with a communication control procedure in a host CPU 8 of a JB node.

FIG. 12 is a detailed flowchart of re-transmission control performed by the multiplex LSI 3 at step S38. It is determined at step S60 whether the timer of step S10 (FIG. 11) has run out of time, namely whether this is a transient period following change of the power supply. If this is a transient period, the received reception ACK pattern is deemed unreliable and, hence, no processing is performed.

If the transient period is not found at step S60, the status of the power supply read in at step S12 is checked at step S62. Next, at step S64, the registered ACK patterns (FIGS. 5A-5C) conforming to the power supply states are read out of the prescribed memory of the ROM or the like in which the patterns were stored in advance. The reception ACK pattern received at step S34 is compared with these registered ACK patterns at step S66 to determine when they are non-coincident. If coincidence is found, this means that all of the ACK signals were returned from the active nodes at the presently prevailing power supply states. As a result, a re-transmission counter is reset at step S68. The presence of a CRC error during reception and the presence of a collision error during transmission are also checked for at step S66.

It is determined at step S70 whether a transmission is in progress at the present time. If a transmission is in progress, this means that the frame data could be sent to all nodes. Accordingly, the data is cleared at step S72.

If an error is detected or non-coincidence with the ACK pattern is found at step S66, an "ACK history register" is updated at step S74. More specifically, since a node which has returned the ACK signal even once in a past re-transmission process is construed to be problem-free, as set forth above in connection with FIG. 8, such a node is stored in the "ACK history register" beforehand. Next, at step S76, it is determined from the contents of the "ACK history register" whether a node which is the object of re-transmission exists. If no such node exists, the program proceeds to step S68, at which processing for clearing the re-transmission counter is performed.

If it is decided at step S76 that re-transmission is required, the re transmission counter is incremented at step S78 and then a check is made at step S80 to determine whether the time for three re transmissions has run out. If the time has run out, the present contents of the ACK history register are sent to the CPU 8 at step S82. In response, the CPU 8 executes processing for cutting off the faulty node from the network.

The foregoing is the description of the processing procedure performed by the LSI 3.

The control procedure performed by the CPU 8 of the JB node will now be described with reference to FIG. 13.

The allotting of the burden of communication control management of the physical level and network control to the LSI 3, which is the multiplex interface module, and the CPU 8, in this manner is also for the purpose of dispersing the burdens of the CPU 8 and LSI.

Received frame data (if any) directed to the JB node is received from the LSI 3 at step S40. This frame data is data directed to the JB node from other nodes. Step S40 calls also for input of the ACK history patterns, transmitted at step S82, on the side of the LSI 3. The ACK history patterns are used in the check performed at step S50. Step S42 calls for execution of processing of frame data (if any) directed to the JB node and entered at step S40.

Steps S44 onward are for operations peculiar to the CPU 8 of the JB node, namely for network management such as alarming the system of faulty nodes. These operations are performed at other nodes.

Steps S44 through S48 are the same as corresponding steps 60 through 64 in FIG. 12.

The registered ACK patterns at the prevailed power supply status and the ACK history patterns transmitted at step S82 are compared at steps S50 and S52 to analyze and detect nodes for which non-coincidence is found (i.e., faulty nodes). These faulty nodes are logged and cut out of the system at step S54. A frame for indicating, on the meter MT, the fact that an abnormality has occurred is produced at step S56. This error alarm frame, which is directed to the MT node, includes the numbers of the nodes exhibiting the error as well as data designating the form of the indication. The frame data is sent to the LSI 3 at step S58.

If the MB1 is not busy, this frame is transmitted to the MT node at step S19 by means of the JB node interface LSI 3, which has received the error alarm data.

ADVANTAGES OF THE EMBODIMENT

The embodiment described above has the following advantages:

(1) In an automobile according to this embodiment, three different power supply states are available, namely the +B, ACC and IG power supply states, and the seven nodes such as the JB node assume an active state or inactive state in dependence upon these power supply states. In the prior art, it is difficult to judge whether a node which has not returned the ACK signal is an inactive node or a node that has failed. In accordance with the present embodiment, however, the arrangement is such that which nodes will return the ACK signal and which nodes will not in dependence upon the different power supply states are stored in the memory 103a beforehand. This is done for all nodes in the system. In addition, it is possible to distinguish whether a node which has sent a frame to the network is a failed node or an inactive node by comparing, after the transmission of the frame, the stored ACK patterns (the registered ACK patterns) and the 16-bit pattern of the ACK signal actually returned. This enables the network environment to be accurately comprehended and managed.

(2) As described above in connection with FIG. 8, a node for which the ACK signal has been received even once but for which the ACK signal is not received in a subsequent re-transmission does not pose a problem since the data will already been received normally. This makes efficient error recovery possible.

(3) The final recognition of a failed node is made by the JB node. Information relating to a node recognized as having failed is sent to the MT node, so that the meter MT may indicate which node is faulty.

The arrangement is such that network management is performed by the JB node, which is supplied with power at all times. This assures that monitoring of the network will not be interrupted.

(4) With regard to each node, the CPU 8 executes data processing, while non-multiplex communication control (DSMA/CD control and re-transmission control utilizing the registered ACK patterns) or the like is performed by the multiplex module LSI 3. This lightens the loads on the CPU 8 and LSI 3.

MODIFICATIONS (1) An interrupt from the CPU 8 and frame reception from the multiplex bus MB occur in superposed form asynchronously in the multiplex interface module (LSI). Accordingly, cases arise in which the LSI cannot respond to reception of the frame and return of the ACK signal is not performed, irrespective of the fact that the present time is not the transient period of the power supply change. Such a phenomenon occurs with greater frequency the greater the amount of frame transmission between nodes and the higher the number of nodes.

Since it would be undesirable to misjudge the foregoing as being an abnormality, it is proposed that network management control in the above-described embodiment be modified as follows: The ACK table management algorithm implemented by the multiplex LSI 3 described in connection with FIG. 8 should be applied also to network management based on the reception ACK patterns performed by the CPU. That is, in the foregoing embodiment, re-transmission control described with reference to FIG. 8 is executed by the multiplex LSI 3. However, the system can be so modified that this is executed by the CPU 8. More specifically, in the frame transmission/reception between nodes, the maximum number of re-transmissions is set at three. Therefore, if coincidence with the registered ACK patterns is not achieved three times with regard to a reception ACK pattern received from the LSI 3 by the CPU 8 of a node, this node is regarded as being abnormal.

Figure 14:
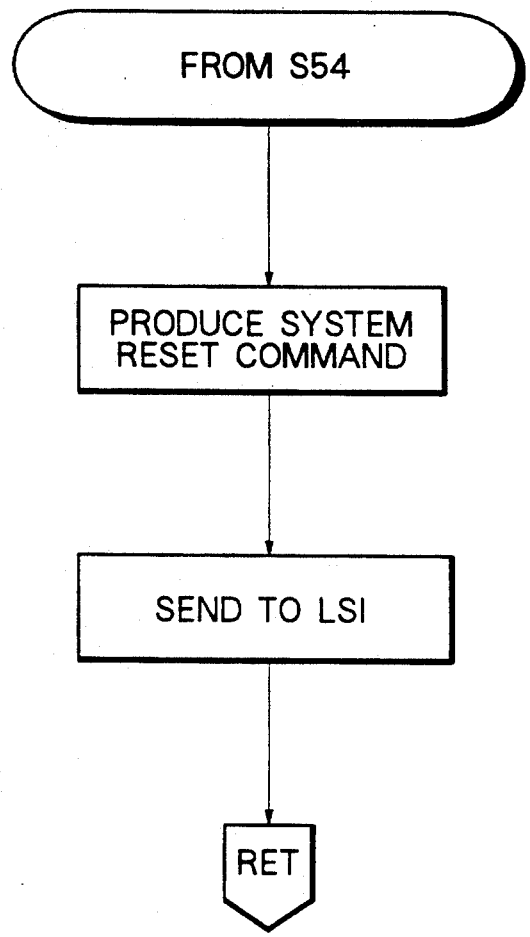
FIG. 14 is a flowchart of a control procedure according to a modification of the embodiment of the invention.

(2) In the above-described embodiment, the JB node informs of detection of an abnormality by means of an indication presented on a meter. However, a modification is possible in which, rather than transmitting an alarm to the MT node, a system reset command is sent to all nodes. When a frame which includes the system-reset command is received by a node, this node assumes a reset state. In this case, the JB node control procedure is modified as shown in FIG. 14. With regard to a node which has received the frame including the system reset command from the JB node, the CPU 8 of the node analyzes the frame and senses the reset command. With such an arrangement, the CPU 8 of each node resets its own. LSI 3 and initializes its various own data.

(3) In the above-described embodiment, the CSMA/DC system is applied However, if the communication system is of the so-called broadcast type, which is set up so that all nodes that have received a transmitted frame send back the ACK signal, the present invention can be applied to all of such communication systems.

(4) In the above-described embodiment, various registered ACK patterns are set in dependence upon the status of the power supply. However, the present invention is not limited to a form in which ACK patterns expected to be received are made to differ depending upon the power supply status. That is, the invention is applicable to a modification in a network system wherein the number of active nodes changes depending upon a change in environmental conditions, in which the active nodes are capable of recognizing the change in environmental conditions and register, in advance, ACK patterns conforming to this change.

Thus, it should be understood that the present invention can be modified in various ways within the scope of the claims.

What is claimed is:

1. A multiplex transmission system for automotive vehicles, having a plurality of communication nodes interconnected via a common multiplex transmission line, each of said plurality of communication nodes comprising:

communication control means for controlling communication among said communication nodes in accordance with a decentralized multiplex protocol;

transmitting means for transmitting a reception acknowledgement signal to the multiplex transmission line in a transmission phase when reception data from the other communication nodes via the multiple transmission line has been received error-less in a reception phase;

memory means for storing beforehand reception acknowledgment reference patterns from respective ones of said communication nodes, each of the reference patterns defining a power ON/OR condition of each communication node;

detection means for detecting a current power ON/OFF condition;

comparator means for comparing, after a transmission, a signal pattern having actual reception acknowledgement signals from the other communication nodes with the reference pattern which corresponds to a power ON/OFF condition detected by the detection means; and re-transmission control means for performing re-transmission control of communication among said communication nodes based on the results of the comparison by said comparator means.

2. The system according to claim 1, wherein data exchanged among said communication nodes is composed of a frame data field of a bit serial, and a reception acknowledgment signal field of a bit serial following said frame data field, bit positions in said reception acknowledgment signal field being decided in advance with regard to each of said communication nodes.

3. The system according to claim 1, wherein said power ON/OFF condition changes in a dependence upon position of an engine key, active nodes among said plurality of communication nodes being decided in each power condition.

4. The system according to claim 3, wherein said power ON/OFF conditions are a state in which the engine key is inserted, a state in which the engine key is in an ACC position, and a state in which the engine key is in an ON position.

5. The system according to claim 1, wherein, with regard to a communication node which has received a reception acknowledgment signal at least one time in a re-transmission process, said comparator means does not adopt, as a condition for performing re-transmission, non-arrival of the reception acknowledgment signal in a subsequent re-transmission process.

6. The system according to claim 5, wherein said re-transmission control means comprises:
   means for counting the number of re-transmission;
   means for comparing the counted number of re-transmission with a maximum number of re-transmissions; and
   means for judging, when the maximum number of re-transmissions is exceeded, that a communication node, which has not received the reception acknowledgment signal even once by the time this maximum number of re-transmissions is made, is faulty.

7. A multiplex transmission system for automotive vehicles, having a plurality of communication nodes interconnected via common multiplex transmission line, said plurality of communication nodes comprising:
   a management node and a plurality of ordinary nodes, each of said plurality of ordinary nodes having
      (a) communication control means for controlling communication among said communication nodes in accordance with a decentralized multiplex protocol;
      (b) transmitting means for transmitting a reception acknowledgement signal to the multiplex transmission line upon receiving reception data from the multiplex transmission line normally in a reception node;
      (c) memory means for storing beforehand, as data in table form, reception acknowledgment signals from respective ones of said communication nodes in a predetermined state, wherein said predetermined state is a power supply state which changes in dependence upon position of an engine key, active nodes among said plurality of communication nodes being decided in each power supply state;
      (d) comparator means for comparing, after a transmission, an actual reception acknowledgment signal from each communication node with said data in table form in a transmission mode; and
      (e) re-transmission control means for performing re-transmission control communication among said communication nodes based on results of the comparison by first comparator means; and
   said management node having
      (f) reading means for reading reception acknowledgment signals exchanged among said plurality of ordinary nodes;
      (g) memory means for storing beforehand, as data in table form, reception acknowledgement signals from respective ones of said communication nodes in a predetermined state;
      (h) comparator means for comparing a reception acknowledgement signal read by said reading means with said data in table form; and
      (i) management means for performing network management based on results of the comparison by said management node comparator means.

8. The system according to claim 7, wherein said power supply states are a state in which the engine key is inserted, a state in which the engine key is in an ACC position, and a state in which the engine key is in an ON position.

* * * * *